United States Patent
Maiwald et al.

(10) Patent No.: US 11,852,180 B2
(45) Date of Patent: Dec. 26, 2023

(54) JOINING ELEMENT

(71) Applicant: EJOT GmbH & Co. KG, Bad Berleburg (DE)

(72) Inventors: Mario Maiwald, Creuzburg (DE); Eberhard Christ, Tambach-Dietharz (DE)

(73) Assignee: EJOT GMBH & CO. KG, Bad Berleburg (DE)

( * ) Notice: Subject to any disclaimer, the term of this patent is extended or adjusted under 35 U.S.C. 154(b) by 545 days.

(21) Appl. No.: 16/969,973

(22) PCT Filed: Feb. 13, 2019

(86) PCT No.: PCT/EP2019/053594
§ 371 (c)(1),
(2) Date: Aug. 13, 2020

(87) PCT Pub. No.: WO2019/158608
PCT Pub. Date: Aug. 22, 2019

(65) Prior Publication Data
US 2020/0400183 A1    Dec. 24, 2020

(30) Foreign Application Priority Data
Feb. 13, 2018  (DE) ............... 10 2018 103 205.6

(51) Int. Cl.
*F16B 25/10*    (2006.01)
*F16B 5/02*    (2006.01)
*F16B 25/00*    (2006.01)

(52) U.S. Cl.
CPC .............. *F16B 25/106* (2013.01); *F16B 5/02* (2013.01); *F16B 25/0031* (2013.01);
(Continued)

(58) Field of Classification Search
CPC .......... F16B 5/02; F16B 5/0275; F16B 25/00; F16B 25/0031; F16B 25/0063;
(Continued)

(56) References Cited

U.S. PATENT DOCUMENTS 470,804 A * 3/1892 Jones ...................... F16B 4/004
411/424
1,912,222 A * 5/1933 Rosenberg .............. F16B 15/06
411/453
(Continued)

FOREIGN PATENT DOCUMENTS

DE    3043478 A1    7/1982
DE    3263920 A1    7/1985
(Continued)

OTHER PUBLICATIONS

International Search Report and Written Opinion.
German Search Report dated Feb. 18, 2018.

*Primary Examiner* — Roberta S Delisle
(74) *Attorney, Agent, or Firm* — WOMBLE BOND DICKINSON (US) LLP; Joseph Bach, Esq.

(57) ABSTRACT

The invention relates to a joining element (10, 50, 70, 100, 130) for connection to at least one component layer (34, 62, 84, 112), comprising a head (12, 52) having a head supporting surface (16, 140) for abutment against a component layer and at least one drive feature (14), via which the joining element can be rotated. The joining element further comprises a shaft (17), which ends via a hole forming element (18, 54, 90, 106) in a point (38), wherein the length of the shaft, from the head supporting surface to the point, is shorter than five times the maximum shaft outer diameter (DMax), wherein the shaft has a holding region (H) for connection to the component layer. A removal region having a removal profile (20, 56, 72, 102, 134) extends on the shaft, subsequent to the holding region in the direction of the point (Continued)

(38), and the removal region starts spaced apart from the head supporting surface at a distance of at least once the maximum shaft outer diameter.

33 Claims, 5 Drawing Sheets

(52) U.S. Cl.
CPC ...... *F16B 25/0063* (2013.01); *F16B 25/0073* (2013.01); *F16B 25/10* (2013.01)

(58) Field of Classification Search
CPC .............. F16B 25/0073; F16B 25/0078; F16B 25/106; F16B 33/02; F16B 35/041; F16B 25/10
USPC ...................... 411/386, 387.4, 411, 424, 426
See application file for complete search history.

(56) References Cited

U.S. PATENT DOCUMENTS

| | | | | |
|---|---|---|---|---|
| 4,827,756 | A * | 5/1989 | Crigger | F16B 39/282 470/11 |
| 4,915,561 | A * | 4/1990 | Buhri | F16B 19/14 411/441 |
| 5,234,301 | A * | 8/1993 | Grossberndt | F16B 25/106 411/386 |
| 5,361,478 | A | 11/1994 | Grossberndt | |
| 5,540,531 | A * | 7/1996 | Choiniere | F16B 25/0063 411/387.1 |
| 5,658,109 | A * | 8/1997 | Van Allman | F16B 19/14 411/499 |
| 5,860,866 | A * | 1/1999 | Van Allman | F16B 19/14 163/6 |
| 6,171,042 | B1 * | 1/2001 | Olvera | F16B 15/00 411/441 |
| 6,428,258 | B1 * | 8/2002 | Osterle | F16B 25/0084 411/386 |
| 8,277,923 | B2 | 10/2012 | Christ | |
| 8,342,788 | B2 * | 1/2013 | Matthiesen | F16B 25/0047 411/386 |
| 8,449,237 | B2 * | 5/2013 | Armiento | F16B 15/00 411/487 |
| D684,039 | S * | 6/2013 | Rose | D8/388 |
| 8,782,899 | B2 | 7/2014 | Draht et al. | |
| 9,175,708 | B2 * | 11/2015 | Werthwein | F16B 25/106 |
| 9,435,366 | B2 | 9/2016 | Draht et al. | |
| 9,901,974 | B2 | 2/2018 | Pfeiffer et al. | |
| 10,138,921 | B2 | 11/2018 | Miller et al. | |
| 10,508,676 | B2 | 12/2019 | Miller et al. | |
| 2012/0107070 | A1 * | 5/2012 | Bongartz | F16B 25/106 411/378 |
| 2013/0047414 | A1 * | 2/2013 | Werthwein | F16B 25/0078 29/525.12 |
| 2015/0176623 | A1 | 6/2015 | Vogel et al. | |
| 2016/0091010 | A1 * | 3/2016 | Freis | F16B 25/0021 411/387.1 |
| 2016/0312817 | A1 * | 10/2016 | Park | F16B 25/10 |

FOREIGN PATENT DOCUMENTS

| | | |
|---|---|---|
| DE | 102007030806 A1 | 7/2007 |
| DE | 202008015352 B2 | 2/2009 |
| DE | 102010044887 A1 | 5/2011 |
| DE | 102011109815 A1 | 2/2013 |
| EP | 2455562 A1 | 5/2012 |

* cited by examiner

JOINING ELEMENT

This application is the national phase of International Application No. PCT/EP2019/053594, filed on Feb. 13, 2019, which claims priority to and the benefit of German Patent Application No. 102018103205.6, filed on Feb. 13, 2018, the disclosures of which are hereby incorporated by reference in their entireties.

The invention relates to a joining element of the type specified in the preamble of claim 1.

DE 10 2012 215 901 A1 relates to a screw having a cutting edge at its tip, which screw cuts a hole in a first component and then flow-drills a hole in a second, underlying component. In the material softened by the action of the tip penetrating the bottom component layer, the thread is then formed by pressing.

Also known in the prior art are so-called friction pins, as disclosed for example in DE 10 2006 002 238 A1, DE 10 2011 109 815 A1 and DE 10 2007 033 126 A1. This type of joining element has a clamping region provided under its head for clamping a top sheet metal part in place, which clamping region is followed by a holding region. The holding region is adapted, in particular by being provided with thread-like structures, to form a connection with the bottom component and thus firmly attach the top component to the bottom component.

DE10 2007 030 806 A1 discloses a joining element which is driven through a composite component that consists of at least two component layers, thus producing at least one partial friction-welded joint between the component layers and the joining element.

The disadvantage of this type of connection is that the friction-welded zone cannot be reliably formed in an easy way, especially for the connection of component layers of a composite component in composite construction.

It is the object of the invention to provide a joining element which can be used to obtain an improved connection of different component layers.

The invention is based on the insight that foreign matter from the top and bottom component layers may enter the welded joint between the bottom component layer and the joining element, thus adversely affecting the formation of a welded joint.

In a known manner, a joining element for connection to at least one component layer comprises a head which has a head supporting surface for contact with a component layer and at least one drive feature, in particular in the form of an external drive, which can be used to drive and rotate the joining element via a positive engagement therewith. In addition, a centering structure in the form of a recess or raised portion may be provided on the head, for centering it with the drive tool. The joining element further comprises a shaft ending in a flow drilling tip, with the length of the shaft, from the head supporting surface up to the free end of the joining element at the tip, being less than five times the maximum outer diameter of the shaft. Furthermore, the shaft has a holding region for connecting the joining element to at least one component layer.

In accordance with the invention, subsequent to the holding region, a removal region extends on the shaft in the direction of the tip, which removal region includes a removal profile and starts at a distance of at least the single maximum shaft outer diameter from the head supporting surface, from where it extends in the direction of the tip.

In particular, the holding region and the removal region of the joining element are differently formed.

As the joining element penetrates a top component layer, its removal structures will accommodate removed material in their recesses, so as to prevent any entrained top layer material from being pressed between the joining element and the bottom component layer. This results in an improved quality of a friction welding zone thus formed. The friction-welded zone may exhibit partial friction-welded joints that are formed between the joining element and the bottom component layer. Entraining material from the bottom component layer, i.e. the base layer, also improves the quality of the partial friction-welded joint, because this results in the creation of a metallically pure contact surface.

The removal profile is in particular negatively reproduced with respect to the shaft.

In a preferred embodiment of the invention, the removal profile is located in an area which is spaced by more than 1.5 times the maximum shaft outer diameter from the free end of the fastener in the direction of the head.

The removal profile is preferably located in an area of the shaft, the diameter of which is at least 80% of the maximum shaft outer diameter. In particular, the outer diameter of the removal profile in the removal region is less than 90%, and is in particular between 80% and 90%, of the maximum shaft outer diameter.

Advantageously, the removal profile transitions into the hole-forming element, with the diameter of the hole-forming element in the transition from the hole-forming element to the removal region being larger than the core diameter in the removal region.

The core diameter/outer diameter ratio in the removal region is preferably between 85% and 95%.

Preferably, the outer diameter of the removal profile is less than the smallest outer diameter in the holding region.

Furthermore, provision may be made for the outer diameter to increase in the transition from the removal region to the holding region. This may be the case in particular at a transition from a removal region having a constant outer diameter to a holding region having an outer diameter that increases in the direction of the head.

At its free end, the tip of the hole-forming element may have a maximum diameter of 25% of the maximum shaft diameter. This means that the tip can also be constituted by an end face.

Preferably, such an end face can have a recess in the area of the axis of the joining element. This thus already allows material from the cover layer to be accommodated in the recess.

The joining element may be made of a steel having a tensile strength of more than 600 MPa, in particular of more than 800 MPa, or of a non-ferrous alloy, in particular a copper alloy or a titanium alloy or an aluminum alloy.

According to another advantageous embodiment, the hole-forming element has a length not exceeding 1.3 times the maximum outer diameter. Accordingly, the transition from the shaft to the hole-forming element, starting from the free end of the joining element, is spaced 1.3 times the maximum outer diameter therefrom.

In particular, the tip is ogival in longitudinal section, meaning that it is formed by the intersection of two circles having a radius R of $0.6*D_{tip/shaft} \leq R \leq 2.5*D_{tip/shaft}$. The centers of the intersecting circles are spaced from each other by $2R-D_{tip/shaft}$ and are symmetrically disposed relative to the center axis of the fastener. This design exhibits a particularly advantageous penetration behavior and results in particularly good rim hole formation.

In a particularly preferred embodiment, the holding region has a thread-like holding structure in a first pitch direction, with the course of the removal profile being such that it does not correspond to the first pitch direction.

The thread-like holding structure is designed in particular in the form of a trapezoidal thread or round thread, with the core diameter/outer diameter ratio being between 0.85 and 0.95. In particular, the maximum flank angle of a trapezoidal thread-like holding structure is 30°. The thread-like holding structure may also exhibit a non-symmetrically divided flank.

This thus allows more material from the top layer to accumulate in the recesses of the thread-like holding structure, which material will then form a material bond—due to friction—with the material in the base layer, provided it is the same material. This is of particular significance in cases where the top layer material corresponds to that of the base layer, but the joining element is made of a material that cannot be bonded to the component layers. As a result, the top layer material entrained by the holding structure will be able to form a bond connection with the base layer material, after which the joining element with its holding structures will be accommodated therein in a form-fit in the axial direction and, if necessary, will additionally also be partially integrally joined therewith.

The removal structure can be orthogonal or parallel to the axis of the joining element. This type of removal structure can be manufactured very easily.

Alternatively, the removal profile can have removal structures of a thread-like design, with its pitch extending in a direction opposite to the pitch direction of the holding structure. This allows the joining element to be inserted in a direction of rotation that is opposite to the direction of rotation of the removal structure. As a result, as much material as possible from the top and base layers will be accommodated in the recesses of the removal profile as the joining element penetrates the top layer, since the opposite pitch direction acts in the manner of a transport screw, generating a counter pressure and preventing the joining element from advancing further by itself.

As usual, the pitch direction of the holding structure in the holding area can be of the right-hand type, as in the case of screws.

In another preferred embodiment of the invention, a clamping region is provided between the head and the holding region, which clamping region is in particular profile-free. In this case, the joining action of the joining element is achieved by the joining element being connected to the base layer in an integrally bonded manner and/or by means of a form fit, and in which case at least one top layer is to be clamped in place between the head and the base layer.

Preferably, the outer diameter is conical over the holding region. This results in higher radial pressure when connecting the joining element with the at least one base layer. Higher radial pressure facilitates the formation of a welded joint between the joining element and the base layer and also ensures that any clearances between the holding structures will be filled.

The conical shape of the holding structures is preferably obtained by the gap between the holding structures increasing in the direction of the head, with the outer diameter increasing accordingly.

This is considered particularly advantageous, because when manufacturing the holding region by forming, for example by thread rolling, the material will flow outwards as the gap gets wider, due to the volume constancy.

As an alternative, a transition region, in particular of conical shape, can be provided between a cylindrical removal region and a cylindrical holding region that is larger in diameter than the removal region. As a result of the increase in diameter, a higher radial pressure is built up, which will have a positive effect on the connection produced. The conical transition lies at an angle of less than 10° tip angle.

In particular, the outer diameter can be cylindrical over the removal region. This leads to a uniform hole formation in the top layer.

In another preferred embodiment, the outer diameter of the shaft is cylindrical over the clamping region. This allows the head to exert its full clamping action on the top layer.

The holding structure preferably has a pitch between 0.3 mm and 2 mm. This is particularly true for a joining element having a maximum diameter of between 2.5 mm and 4 mm.

The pitch of the removal profile, if of a thread-like design, will also be between 0.3 mm and 2 mm.

Preferably, the holding region extends between where the removal profile starts on the head side and the head supporting surface, with the holding region in particular being spaced from the head supporting surface at between 2 mm and 6 mm.

The shaft may be non-circular in cross-section, in particular polygonal or trilobular in cross-section, where, in the case of a polygonal cross-section, the surfaces will be connected by rounded edges.

Preferably, the tip may have a greater hardness than the shaft. This can be achieved in particular by subjecting the tip of the joining element to an additional hardening process.

According to another aspect of the invention, the invention relates to a composite component that comprises at least two superimposed component layers in the form of a base layer and an overlying top layer, which layers are connected to one another by means of a joining element of the type specified in any one of the preceding claims, with the removal region lying below the bottom-most component layer, and material removed from the component layers is accommodated in the recesses of the removal profile.

This has the advantage that the entrained material will be accommodated in the recesses of the removal profile and will thus be prevented from entering between the layers of the component. As a result, the component layers will be urged less far apart in the joining process. This is particularly advantageous in the case of composite components that were pre-bonded to each other by means of an adhesive layer.

Furthermore, if the top layer is made of aluminum and the joining element is made of steel, the front end of which then protruding from the composite component will then be coated with an aluminum layer that acts as corrosion protection.

Preferably, in the composite component, at least one partial welded joint is formed as a result of the frictional energy and pressure acting between the base layer and the joining element.

In particular, the base layer comprises a layer of light metal or steel, while the top layer comprises a component layer of fiber composite plastic, or light metal, or steel. The base layer made of steel preferably has a tensile strength of more than 1,000 MPa.

In a particularly preferred embodiment of the invention, the base layer, including a rim hole made in the base layer during the joining process, may extend over the holding region of the joining element.

The invention further relates to a method for producing a component connection according to the invention that comprises at least two component layers, by means of a joining element according to the invention, wherein the joining element is made to rotate and driven through the component layers with pressure.

The method is characterized in that the joining element, by means of its removal profile, removes material from the at least one top component layer as the joining element penetrates the latter, and the material thus removed is entrained by the joining element all the way through the bottom component layer.

Preferably an at least partial bonded connection is created between the joining element and the base layer. This connection will be of particularly good quality if the base layer and the joining element are made of materials that can be welded together well.

In particular, after the joining element has been placed on the top component layer, it is rotated in a first direction of rotation at a speed of between 5,000 rpm and 10,000 rpm, and is subjected to an axial contact pressure of between 2 kN and 5 kN and thus driven through the composite component.

Therefore, if the joining element has a thread-like holding structure, the latter will be driven in with an axial advance per revolution that is smaller than the advance resulting from the thread pitch, whereby the material will enter into the recesses of the holding structure and then, in the further course of the process, firmly bond to the lateral contact surface at the rim hole thus formed, thus positively holding the joining element in axial direction.

Preferably, in a method according to the invention, a first speed of rotation and a first contact pressure can be used in a first step until the holding region has completely penetrated the cover layer, and subsequently, in a second step, a higher speed than the first speed and a lower contact pressure than the first contact pressure will then be used.

In particular, a speed of 3,000 rpm and 5,000 rpm and a contact pressure of 2 kN to 3 kN will be used in a first direction of rotation in the first step, and a speed of between 7,000 rpm and 10,000 rpm will be used in the second step.

Additional advantages, features and possible applications of the present invention may be gathered from the description which follows, in which reference is made to the embodiments illustrated in the drawings.

In the drawings:

FIG. 5b is an illustration of a second step of a method as shown in FIG. 5a;

FIG. 5c is an illustration of a third step of a method as shown in FIG. 5a;

FIG. 5d is an illustration of a fourth step in a method as shown in FIG. 5a;

FIG. 7a is a lateral view of another embodiment of a joining element according to the invention;

FIG. 7b is a view of a detail in FIG. 7a;

FIG. 8b is a view of a detail of a joining element as shown in FIG. 8a.

Figure 1A:
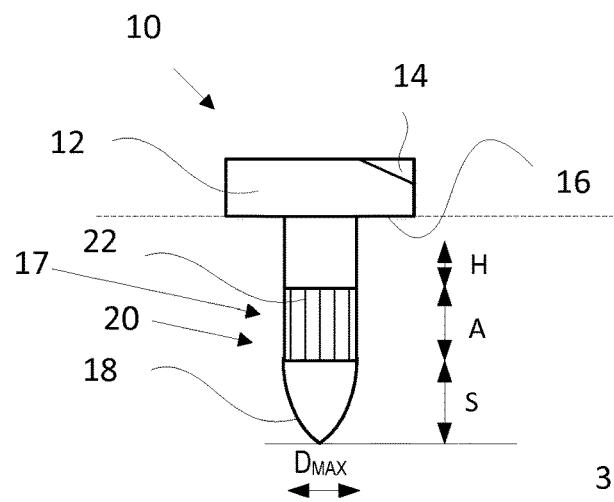
FIG. 1a is a view of a first embodiment of a joining element according to the invention.

The view of FIG. 1a is a first embodiment of a joining element 10 according to the invention. The joining element 10 comprises a head 12 which is provided with drive features 14 of an external drive. The head 12 has a head supporting surface 16 in the direction of the tip 38 of the joining element 10.

This embodiment shows a continuous cylindrical shaft having an outer diameter $D_A$. The outer diameter $D_A$=D is constant over the entire shaft of the joining element 10, except for in the tip region S. At a distance of D from the head supporting surface 16, a removal region A with a removal profile 20 starts to extend along the shaft in the direction of the tip 18. The removal profile 20 as seen in FIG. 1a is designed in the form of longitudinal grooves 22 that run parallel to the center axis of the joining element.

The longitudinal grooves 22 are used to remove material from the component layers through which the joining element 10 is driven. The material removed is then received in the recesses between the longitudinal grooves 22 and entrained therein all the way through the composite component.

The area between the removal profile 20 and the head has no profile. This area also has the holding region H in which a component layer can be connected to the joining element 10.

The joining element 10 has a total length of approx. $3 \times D_{Max}$ from the head supporting surface 16 to the free end of the hole-forming element 18, i.e. the tip 38. The tip region S extends over a length of D, with the removal region also extending over D. As already illustrated, there is a profile-free region between the removal region and the head supporting surface, which profile-free region includes the holding region and the clamping region of the joining element 10. A joining element of this type can be used, for example, to join two component layers which each have a sheet thickness of D/3.

Figure 1B:
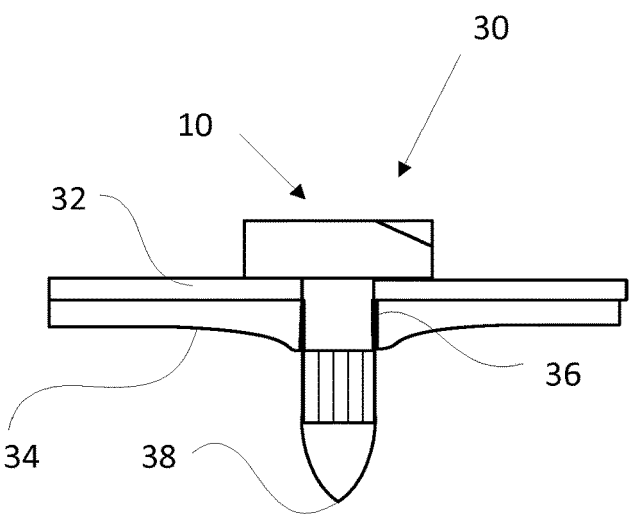
FIG. 1b is a view of a composite component which is connected using a first embodiment of a joining element according to the invention.

FIG. 1b shows a composite component 30 comprising a top layer 32 and a base layer 34, with the top layer 32 preferably being made of a softer material than the base layer 34. The two component layers 32, 34 are connected to one another by a joining element 10 according to the invention, with the base layer being connected to the holding region H of the joining element by means of partial friction-welded joints, whereby on penetration of the bottom component layer a rim hole—a hollow-conical bulge of the base layer 34—is formed. Welding takes place over this area of the base layer 34. The cover layer 32 is clamped between the base layer 34 and the head 12 and is positively held. This is a simple way of connecting the top layer 32 to the base layer 34.

As a result of the removal of material in the base layer 34 after the hole-forming element 18 has made the pilot hole therein, the contact point between the holding region of the joining element 10 and the base layer 34 is substantially metallically clean. This leads to the formation of a joining zone 36, which is formed by the production of high-quality partial friction-welded joints.

Figure 2A:
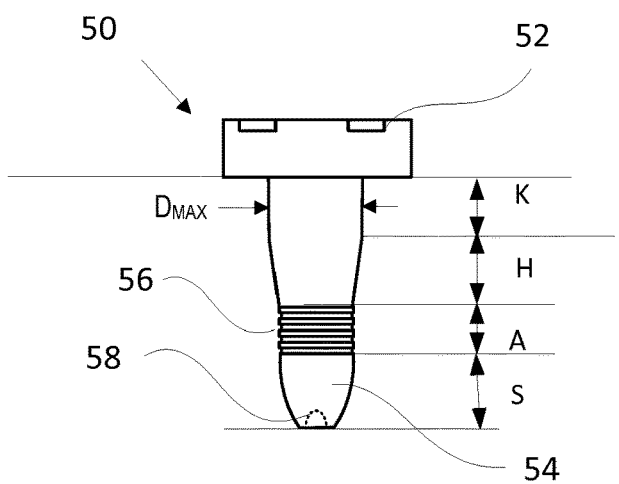
FIG. 2a is a view of a second embodiment of a joining element according to the invention.

Illustrated in FIG. 2a is yet another embodiment of a joining element 50. In this embodiment, the holding region H extends conically and the shaft furthermore has a cylindrical clamping region K in the direction of the head 52. In this embodiment, the maximum outer diameter $D_{Max}$ is in the clamping region, which latter in turn has a constant diameter D. D is preferably between 2.5 mm and 4 mm.

Neither the clamping region K nor the holding region H have a profile formed on them. In the direction of a hole-forming element 54, the conical holding region H is followed by a cylindrical removal region A which has a removal profile 56, according to the invention. The removal profile is in the form of radial grooves which are arranged circumferentially around the shaft.

As the joining element penetrates the component layers, material is removed from the component layers at the surfaces of the pilot hole produced. This may be the case if the component layers have not been pre-punched, or if at least one component layer is provided with a pre-formed pilot hole that is smaller than the diameter of the joining element in the removal region.

Contrary to the embodiment of the joining element 10 of FIG. 1, the joining element 50 has a holding region H of a basic design that is conical and profile-free. The advantage of a conical design of the holding region is that it results in an increase of the radial pressure as the joining element penetrates the base layer, which in turn improves the quality of the partial friction-welded joints between the joining element and the base layer. The clamping region is cylindrical in shape.

Furthermore, the free end of the hole-forming element 54 is of a flat design, with a dashed line indicating a central recess 58. This recess is adapted to receive material during the penetration process.

Figure 2B:
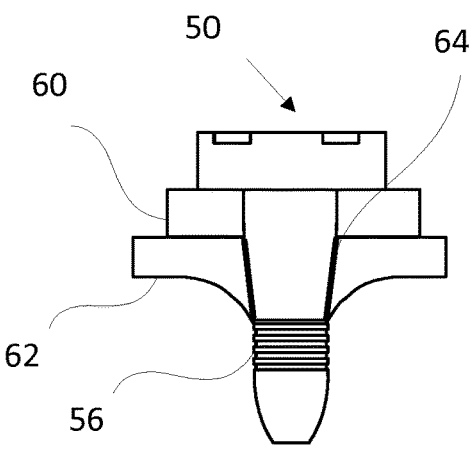
FIG. 2b is a view of a composite component which is connected using a second embodiment of a joining element according to the invention.

FIG. 2b is a view of a component connection consisting of a top layer 60, for example of aluminum, and a base layer 62, which may preferably be formed from a steel sheet, which two layers are held together by means of a joining element 50 according to the invention. As the joining element 50 penetrates the cover layer 60, material removed from the cover layer 60 is received in the radial grooves. This material then no longer enters the space between the top layer 60 and the base layer 62 but is removed from the composite component by way of the radial grooves. When the joining element 50 penetrates the base layer 62, the flow hole-forming tip 54 produces a rim hole. The removal profile 56 that follows the hole-forming element 54 will remove an additional surface layer from the base layer 62 as it penetrates the latter.

The substantially metallically clean surface on the inside of the hole in the base layer and of the rim hole will then bond under friction with the joining element 50, at the conical holding region H thereof, by means of partial friction-welded joints 64. The joining element is driven through the composite component 60, 62 to such an extent that the removal profile 56 will substantially protrude from the composite component 60, 62.

The base layer is positively locked between the head supporting surface of the head and the base layer 62. If the cover layer 60 is in particular made of an aluminum material, such aluminum will be entrained by the joining element 50 in the removal region A thereof and form a coating thereon, thus producing a corrosion protection layer.

Figure 3A:
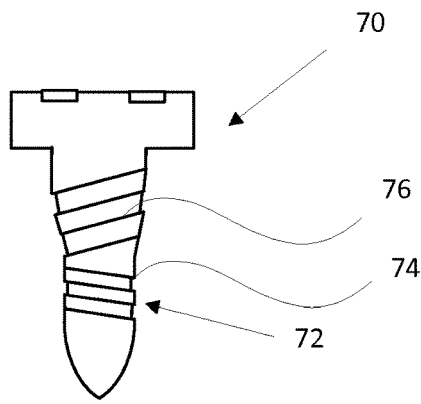
FIG. 3a is a view of a third embodiment of a joining element according to the invention.

FIG. 3a is a view of yet another embodiment of a joining element 70 according to the invention, having a basic shape similar to that of FIG. 2b with a cylindrical removal region, a conical holding region H and a cylindrical clamping region K. The embodiment of FIG. 3a has a removal profile 72 in the form of a thread-like groove 74 extending around the shaft. In addition, the holding region H has a holding structure 76 that also extends in the form of a thread, with the pitch direction of the holding structure being opposite to the pitch direction in the removal profile.

The joining element is inserted into the composite component in a direction of rotation that corresponds to the pitch direction of the holding structure 76. As a result, the removal profile acts in a way similar to a screw conveyor which, while being driven through the component layers, removes material from the component layers at its circumference.

The provision of a holding structure 76 in the holding region H of the joining element 70 results in the component layers being held together more reliably if these are made of a material that is not particularly suitable for direct welding to the joining element 70.

Figure 3B:
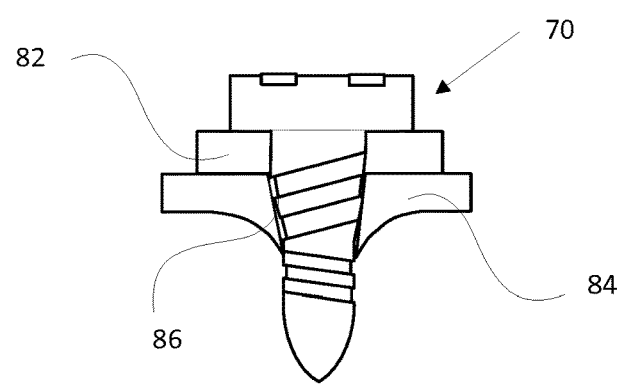
FIG. 3b is a view of a composite component which is connected using a third embodiment of a joining element according to the invention.

This is illustrated in more detail in the view of FIG. 3b. In FIG. 3, both the top layer 82 and the base layer 84 are made of aluminum. As the joining element 70 penetrates the aluminum top layer 82, material from the top layer 82 is received in the holding structure 76 and transported to the base layer 84 during further advance, where, due to the rotation of the joining element 70, it will be bonded to the aluminum base layer 84. The holding structure 76, which is located between the aluminum processed in this manner, thus positively holds the joining element 70 in the base layer 84. As already described above, the cover layer 82 is accommodated between the base layer 84 and the head of the joining element 70.

Figure 4:
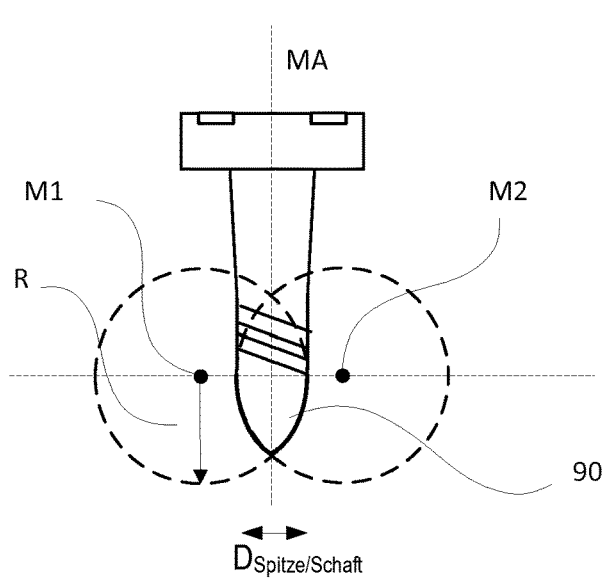
FIG. 4 is a view of a joining element according to the invention, with a hole-forming element that has an ogival contour as seen in the longitudinal section.

FIG. 4 is a view of a hole-forming element 90, which, according to the invention, is approximately ogival as seen in longitudinal section, so that this is formed by the intersection of two circles having a radius R of about 1.8 times the diameter at the transition from the hole-forming element to the shaft, i.e. $D_{tip/shaft}$. The centers M1, M2 of these circles lie on a line which is orthogonal to the center axis MA and are spaced from each other by the distance $R-D_{tip/shaft}$.

This results in the creation of a hole-forming element 90 which enables good flow hole-forming penetration at high speeds and in hard materials and has high thermal stability.

FIGS. 5a to 5d are views of a method for producing a component connection 120 which uses a joining element 100 according to the invention. The joining element 100 has a cylindrical removal region A with a removal profile 102, a conical transition to the cylindrical holding region H that is provided with a holding structure 104, and a profile-free cylindrical clamping region K. The joining element 100 has its maximum outer diameter in the clamping region K.

The pitch direction of the holding structure 104 is clockwise (of the right-hand type), with the pitch direction of the removal profile being opposite to that of the holding structure 104.

Figure 5A:
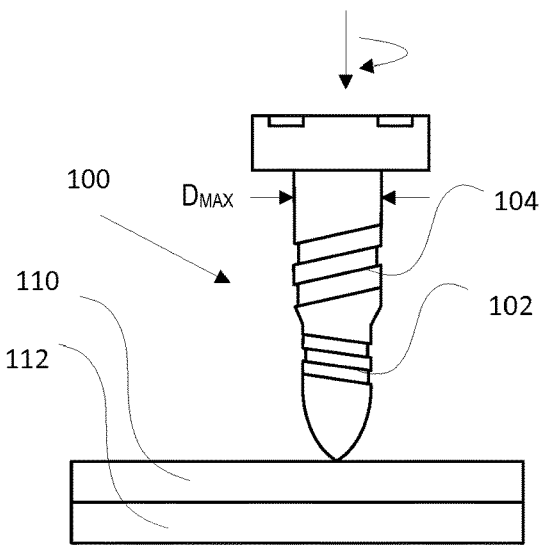
FIG. 5a is an illustration of a method step for the production of a composite component that is connected using a fourth embodiment of a joining element according to the invention.
Figure 5B:
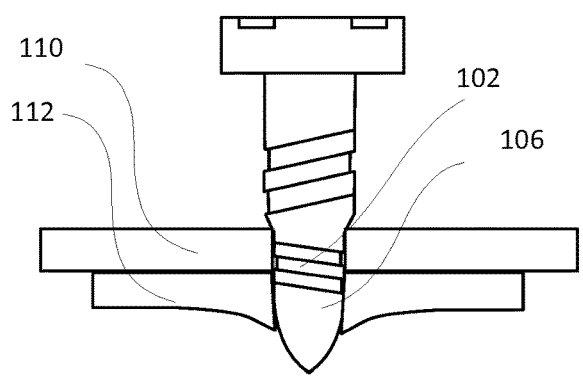

As indicated in FIG. 5a, the joining element 100 is inserted into the top layer 110 of the composite component 120 by rotating it clockwise at a speed of between 2,000 rpm and 4,000 rpm and applying an axial force of between 2 kN and 4 kN. The top layer 110 is preferably made of aluminum and is approximately 1.2 mm thick and heats up as it is penetrated by the hole-forming element 106 that is ogival in longitudinal section. As seen in FIG. 5b, the same is true for the base layer which consists mainly of steel. In particular, the base layer is less than 1.5 mm thick and has a tensile strength of over 800 MPa. In FIG. 5b, the joining element 100 with a removal profile 102 in the transition from the top layer 110 to the base layer 112. As it penetrates the top layer 110 and the base layer 112 in a direction of rotation opposite to its pitch direction, the removal profile 102 removes material from these layers.

Figure 5C:
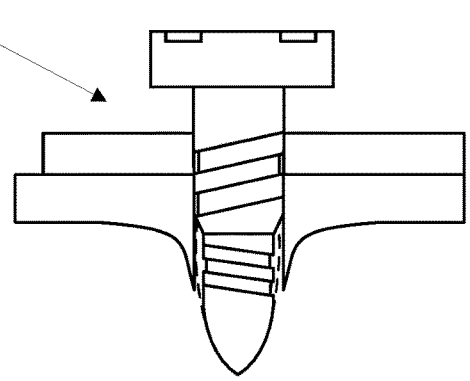

As soon as the holding region H has penetrated the top layer 110, as seen in the view of FIG. 5c, the advance force is halved and the speed is doubled. The result is improved material removal from the base layer by the removal profile 102, and subsequently, a high relative speed between the base layer 112 for producing the partial friction-welded joints.

The above described joining process is illustrated in FIG. 7. Preferably, the joining process is path-controlled, with the regions being essentially determined by the dimensions of the individual sections, i.e. tip, removal region, holding region and clamping region.

As an alternative to path control, it is also possible to use time control, or a combination of path control and time control.

Figure 5D:
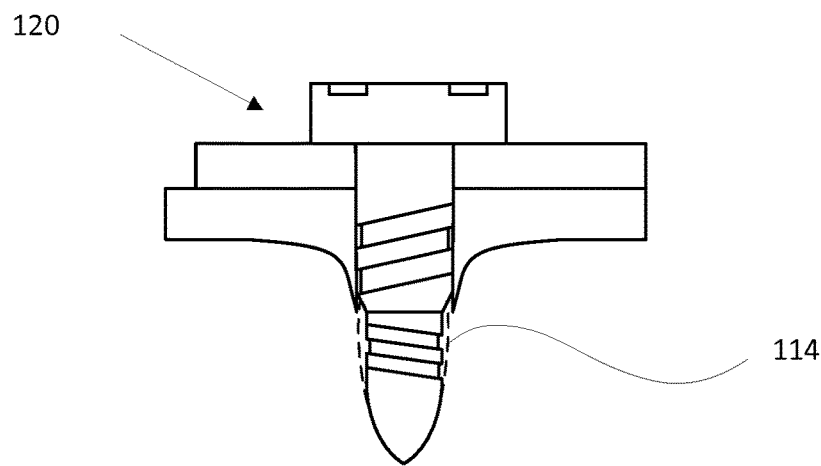

As the joining element penetrates the component layers 110, 112, material removed from the top layer 112 as well as from the base layer 112 is entrained in the removal profile 102. This material, especially from the top layer 110, is entrained all the way through the composite component, which is indicated in FIG. 5d by a deposit 114 having formed on the removal region.

Figure 6:
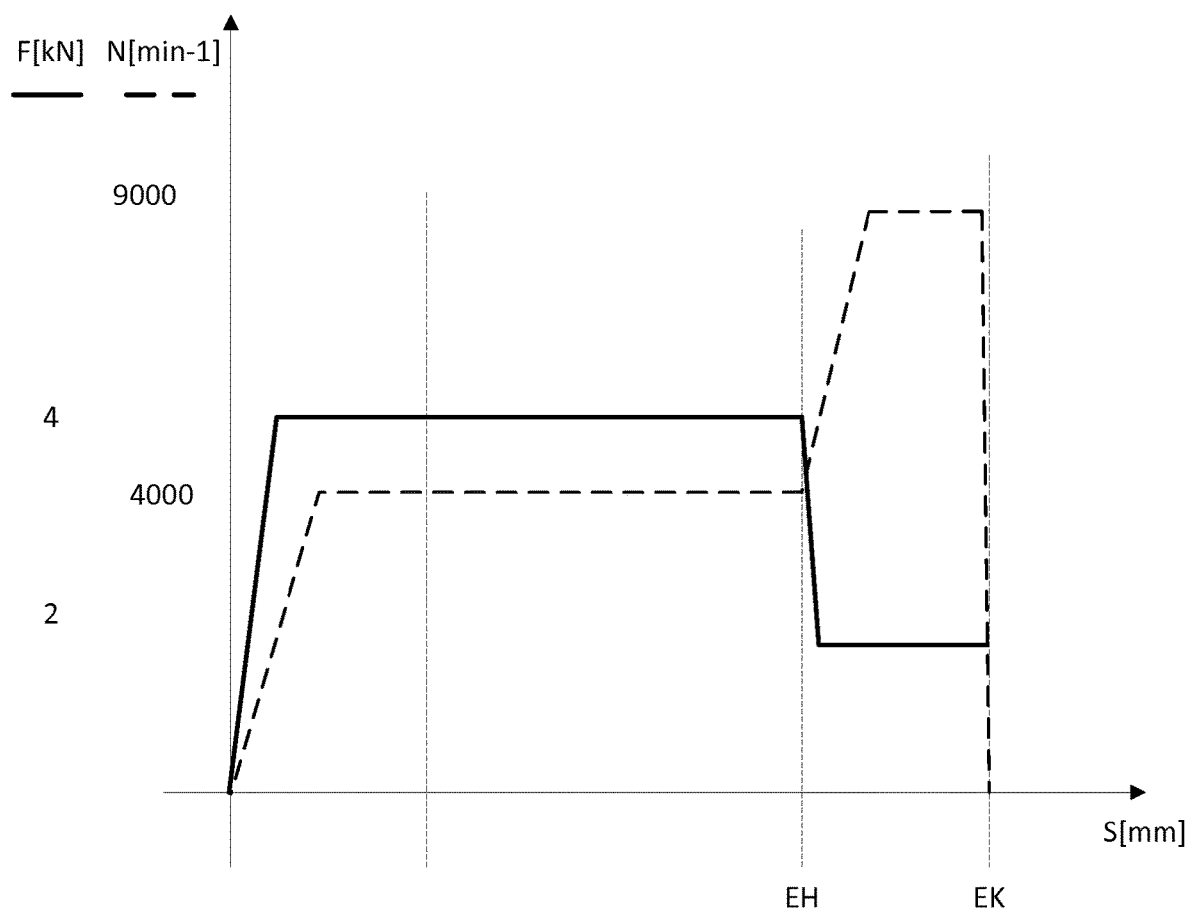
FIG. 6 is a graph illustrating the parameters over the course of the method, for a joining method as shown in FIGS. 5a to 5d.

FIG. 6 is a diagram of the speed—dashed line—used for driving the joining element, and of the axial force—solid line—as a function of the penetration depth of the joining element 100 starting from the top of the cover layer 110.

The speed is accelerated continuously up to 4,000 rpm, and then, at a penetration depth of 10 mm, which corresponds approximately to the transition to the clamping region and approximately half the process time, the speed is continuously increased up to 9,000 rpm. At the same time, the axial force is reduced, with a certain axial force being maintained until the end of the process so as to ensure lower advance at high speed. Among other things, this prevents a thread being cut into the bottom component layer, as the joining element is being overtightened as it were, because the speed/advance is higher than would be permissible for the corresponding pitch to form a thread.

An at least partial substance-to-substance bond is therefore created between the joining element and the base layer 112.

Similar parameters should be used for a connection with the previously described embodiments of joining elements.

Figures 7A, 7B:
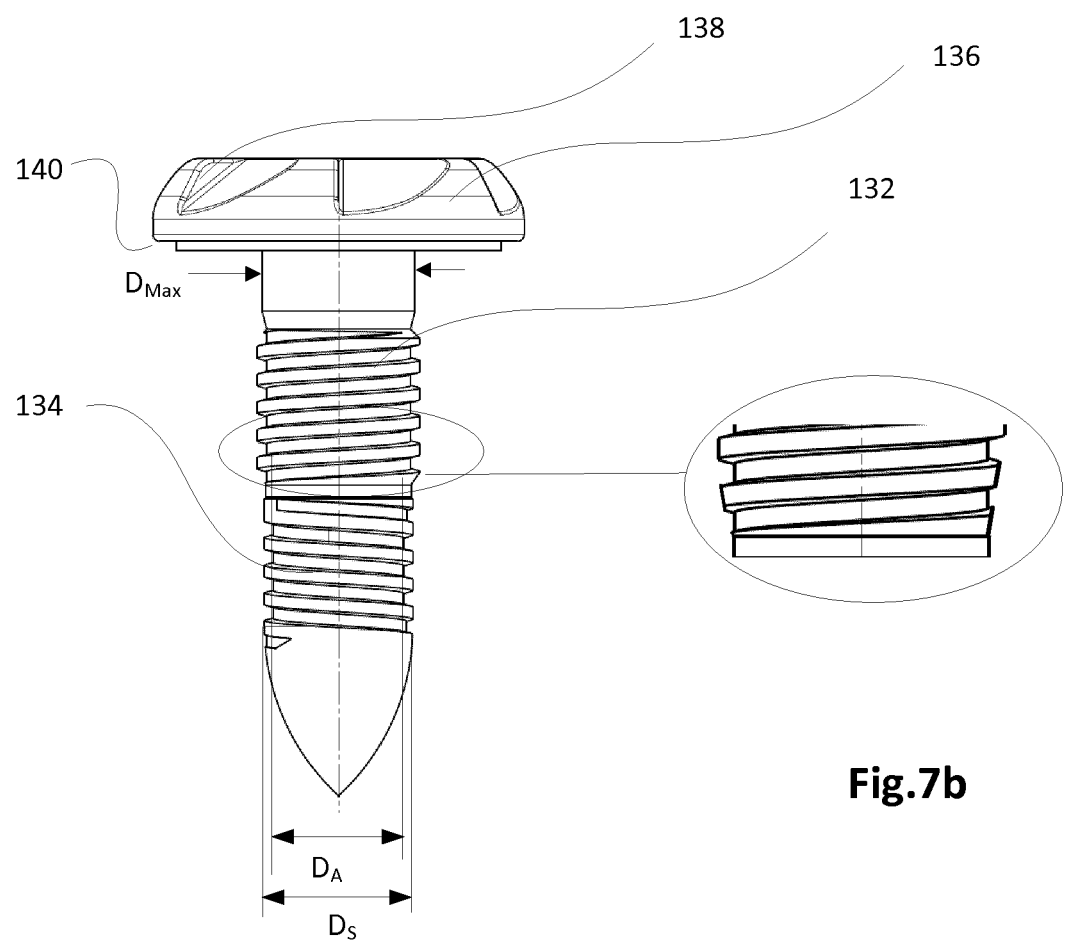

FIG. 7a to FIG. 7b are views of yet another embodiment of a joining element according to the invention. The joining element 130 shown in the lateral view of FIG. 7a has a removal profile with a pitch of 0.6 mm and a maximum diameter in the clamping region K of approx. 3.3 mm.

It can be clearly seen from this view that the core diameter of the hole-forming element $D_S$ in the transition to the removal region is larger than the core diameter in the removal region $D_A$. In a non-profiled hole-forming element, the core diameter of the hole-forming element corresponds to the outer diameter.

The holding structure 132 has the same pitch as the material removal profile but is oriented in the opposite direction to the removal profile 134.

FIG. 7b is an enlarged detail of the shaft of the joining element 130 in the transition from the removal region A to the holding region H. This enlarged detail view clearly shows the conical course for increasing the outer diameter.

It is also clearly seen here that the length of the joining element shaft is measured starting from the head supporting surface 140. Furthermore, this view shows that the joining element 130 is made to rotate via drive surfaces 138 for an external drive that are provided on the head of the joining element 130. The length of the shaft is approx. 3.6 times the maximum diameter $D_{Max}$.

Figure 8A:
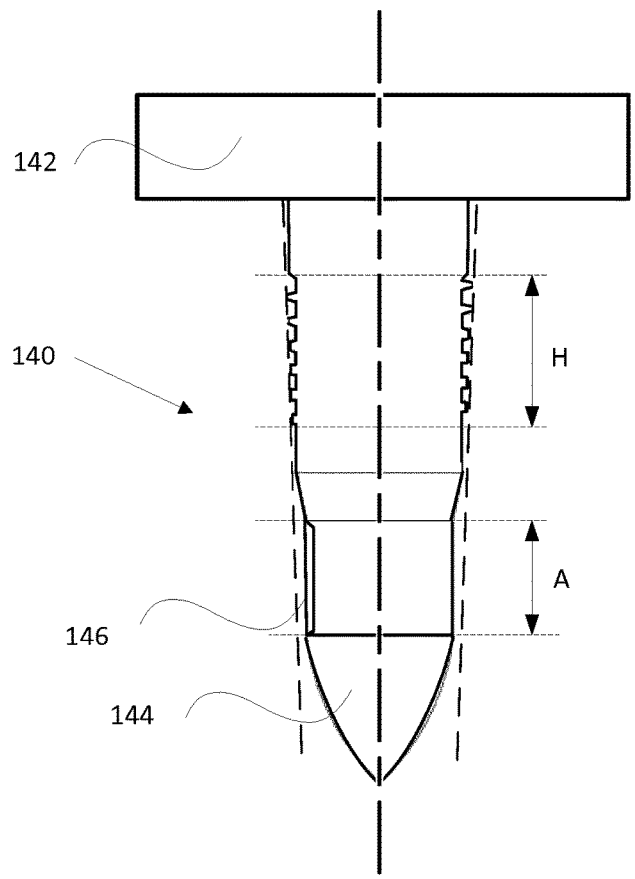
FIG. 8a is a sectional view of a joining element having an outer diameter that increases in the direction of the head.

FIG. 8a is a schematic sectional view of a joining element 140 according to the invention, in which the outer diameter of the joining element 140 increases towards the head 142. Thread-like holding structures are provided in the holding area H, with the distance A, B between the thread-like holding structures increasing towards the head. The axial width of the holding structures decreases towards the head. In particular, the ends of the thread-like holding structures become increasingly pointed towards the head which will allow them to penetrate the base layer more easily. The increasingly pointed end promotes faster heat input into the holding structure, which has a positive effect on the joint strength. The removal structures 146, while indicated as longitudinal grooves in removal region A, may also be thread-like, as described above. The tip 144 may be harder than the shaft.

The increasing outer diameter results in improved holding properties.

Figure 8B:
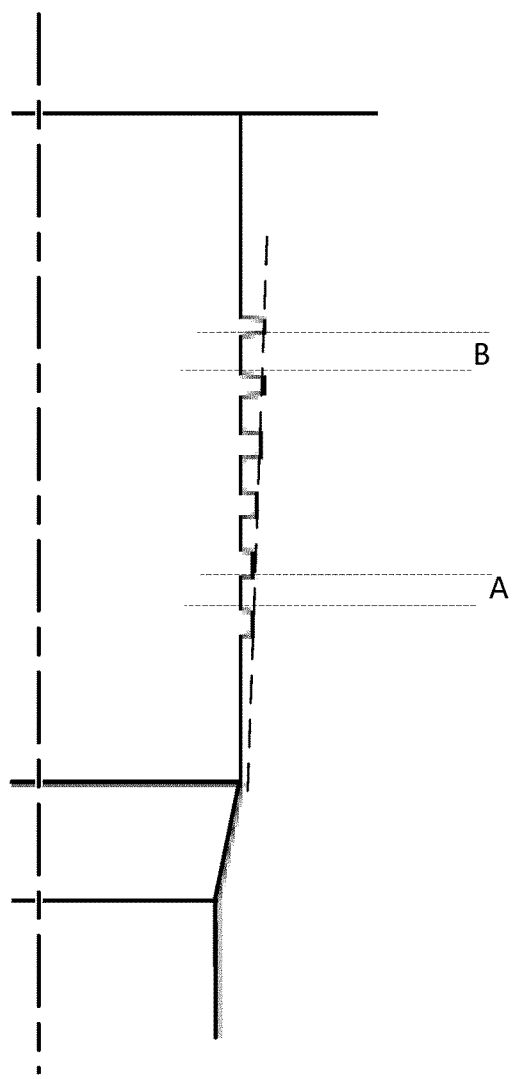

The detail view of FIG. 8b illustrates the increase in the outer diameter towards the head, in which the envelope is indicated in the holding region of the joining element. Furthermore, it can be seen in detail that the holding structures provided on an end of the holding region facing the removal region are spaced from each other by a distance A which is less than the distance B of the holding structures provided on the opposite end of the holding region H.

The invention claimed is:

1. Joining element (10, 50, 70, 100, 130) for connection to at least one component layer (34, 62, 84, 112), comprising a head (12, 52) having a head supporting surface (16, 140) for abutment against a component layer and at least one drive feature (14), via which the joining element (10, 50, 70, 100, 130) can be rotated, as well as a shaft (17) which ends via a hole-forming element (18, 54, 90, 106) in a tip (38), wherein the length of the shaft, from the head supporting surface (16) to the tip (38), is shorter than five times the maximum shaft outer diameter ($D_{Max}$), wherein the shaft (17) has a holding region (H) for connection to the component layer, and a removal region (A) having a removal profile (20, 56, 72, 102, 134) extends on the shaft (17), subsequent to the holding region (H) in the direction of the tip (38), and the removal region (A) starts spaced apart from the head supporting surface (16, 140) at a distance of at least once the maximum shaft outer diameter ($D_{Max}$);
   wherein the holding region (H) has a thread holding structure (76, 104, 132) in a first pitch direction, with the removal profile (20, 56, 72, 102, 134) having a structure, the course of which does not correspond to the first pitch direction.

2. Joining element according to claim 1, wherein the removal profile (20, 56, 72, 102, 134) is located in an area which, in the direction of the head (12, 52), is spaced from the tip (38) by more than 1.5 times the maximum shaft outer diameter ($D_{Max}$) in the direction of the head.

3. Joining element according to claim 1, wherein in the region where it transitions to the removal profile (20, 56, 72, 102, 134), the hole-forming element (18, 54, 90, 106) has a core diameter which is larger than the core diameter in the removal region (A).

4. Joining element according to claim 1, wherein the removal profile (20, 56, 72, 102, 134) lies in a region of the shaft (17), the diameter of which is at least 80% of the maximum shaft outer diameter ($D_{Max}$).

5. Joining element according to claim 1, wherein the removal profile (20, 56, 72, 102, 134) is smaller in its outer diameter than the smallest outer diameter in the holding region (H).

6. Joining element according to claim 1, wherein the hole-forming element (18, 54, 90, 106) has a diameter at its tip (38) of 25%, at the most, of the maximum shaft diameter ($D_{Max}$).

7. Joining element according to claim 6, wherein the tip has an end face which has a recess in the region of the joining element axis (MA).

8. Joining element according to claim 1, wherein in the direction of the head (12, 52), the end of the hole-forming element (18, 54, 90, 106) is spaced from the tip (38) by 1.3 times at the most, in particular by between 0.8 times and 1.2 times, of the maximum shaft outer diameter ($D_{Max}$).

9. Joining element according to claim 1, wherein the hole-forming element (18, 54, 90, 106) is approximately ogival in its longitudinal section so that it is formed by the point of intersection of two circles having a radius R of $0.6*D_{tip/shaft} \leq R \leq 2.5*D_{tip/shaft}$, the centers of which are spaced from each other by $2R-D_{tip/shaft}$.

10. Joining element according to claim 1, wherein the removal profile (20, 56) lies orthogonal or axis-parallel to the axis (MA) of the joining element.

11. Joining element according to claim 1, wherein the pitch direction of the holding structure (76, 104, 134) is right-handed.

12. Joining element according to claim 1, wherein a clamping region (K) exists between the head (12, 52) and the holding region (H), which clamping region (K) is in particular profile-free.

13. Joining element according to claim 1, wherein the outer diameter is constant over the removal region (A).

14. Joining element according to claim 1, wherein the outer diameter of the shaft (17) remains constant over the clamping region (K).

15. Joining element according to claim 1, wherein the pitch of the holding structure (76, 104, 134) is between 0.3 mm and 2 mm.

16. Joining element according to claim 1, wherein the holding region (H) extends from the head-side start of the removal profile (20, 56, 72, 102, 134) in the direction of the head supporting surface (16) and is spaced by between 2 mm and 6 mm from the head supporting surface (16, 140).

17. Joining element according to claim 1, wherein the shaft is non-circular in cross-section, and is polygonal or trilobular in cross-section.

18. Joining element according to claim 1, wherein the tip is of greater hardness than the shaft.

19. Joining element (10, 50, 70, 100, 130) for connection to at least one component layer (34, 62, 84, 112), comprising a head (12, 52) having a head supporting surface (16, 140) for abutment against a component layer and at least one drive feature (14), via which the joining element (10, 50, 70, 100, 130) can be rotated, as well as a shaft (17) which ends via a hole-forming element (18, 54, 90, 106) in a tip (38), wherein the length of the shaft, from the head supporting surface (16) to the tip (38), is shorter than five times the maximum shaft outer diameter ($D_{Max}$), wherein the shaft (17) has a holding region (H) for connection to the component layer, and a removal region (A) having a removal profile (20, 56, 72, 102, 134) extends on the shaft (17), subsequent to the holding region (H) in the direction of the tip (38), and the removal region (A) starts spaced apart from the head supporting surface (16, 140) at a distance of at least once the maximum shaft outer diameter ($D_{Max}$);

wherein the hole-forming element (18, 54, 90, 106) is approximately ogival in its longitudinal section so that it is formed by the point of intersection of two circles having a radius R of $0.6*D_{tip/shaft} \leq R \leq 2.5*D_{tip/shaft}$, the centers of which are spaced from each other by $2R-D_{tip/shaft}$, and, wherein the removal profile (72, 102, 134) extends in the manner of a thread and its pitch direction is opposite to the pitch direction of the holding structure (76, 104, 134).

20. Joining element according to claim 19, wherein the pitch of the removal profile (74, 102, 132) is between 0.3 mm and 2 mm.

21. Joining element (10, 50, 70, 100, 130) for connection to at least one component layer (34, 62, 84, 112), comprising a head (12, 52) having a head supporting surface (16, 140) for abutment against a component layer and at least one drive feature (14), via which the joining element (10, 50, 70, 100, 130) can be rotated, as well as a shaft (17) which ends via a hole-forming element (18, 54, 90, 106) in a tip (38), wherein the length of the shaft, from the head supporting surface (16) to the tip (38), is shorter than five times the maximum shaft outer diameter ($D_{Max}$), wherein the shaft (17) has a holding region (H) for connection to the component layer, and a removal region (A) having a removal profile (20, 56, 72, 102, 134) extends on the shaft (17), subsequent to the holding region (H) in the direction of the tip (38), and the removal region (A) starts spaced apart from the head supporting surface (16, 140) at a distance of at least once the maximum shaft outer diameter ($D_{Max}$);

wherein the outer diameter increases continuously over the holding region (H) in the direction of the head (12, 52).

22. Joining element (10, 50, 70, 100, 130) for connection to at least one component layer (34, 62, 84, 112), comprising a head (12, 52) having a head supporting surface (16, 140) for abutment against a component layer and at least one drive feature (14), via which the joining element (10, 50, 70, 100, 130) can be rotated, as well as a shaft (17) which ends via a hole-forming element (18, 54, 90, 106) in a tip (38), wherein the length of the shaft, from the head supporting surface (16) to the tip (38), is shorter than five times the maximum shaft outer diameter ($D_{Max}$), wherein the shaft (17) has a holding region (H) for connection to the component layer, and a removal region (A) having a removal profile (20, 56, 72, 102, 134) extends on the shaft (17), subsequent to the holding region (H) in the direction of the tip (38), and the removal region (A) starts spaced apart from the head supporting surface (16, 140) at a distance of at least once the maximum shaft outer diameter ($D_{Max}$);

wherein the outer diameter increases in the transition from the removal region (A) to the holding region (H).

23. Joining element (10, 50, 70, 100, 130) for connection to at least one component layer (34, 62, 84, 112), comprising a head (12, 52) having a head supporting surface (16, 140) for abutment against a component layer and at least one drive feature (14), via which the joining element (10, 50, 70, 100, 130) can be rotated, as well as a shaft (17) which ends via a hole-forming element (18, 54, 90, 106) in a tip (38), wherein the length of the shaft, from the head supporting surface (16) to the tip (38), is shorter than five times the maximum shaft outer diameter ($D_{Max}$), wherein the shaft (17) has a holding region (H) for connection to the component layer, and a removal region (A) having a removal profile (20, 56, 72, 102, 134) extends on the shaft (17), subsequent to the holding region (H) in the direction of the tip (38), and the removal region (A) starts spaced apart from the head supporting surface (16, 140) at a distance of at least once the maximum shaft outer diameter ($D_{Max}$);

wherein the outer diameter of the holding region (146) increases in the direction of the head (142).

24. Joining element according to claim 23, wherein the gap (A, B) between two adjacent holding structures increases in the direction of the head.

25. A composite component (30, 80) comprising at least two superimposed layers of components (32, 34; 60, 62; 82, 84; 110, 112) connected by a joining element (10, 50, 70, 100, 130), wherein the joining element comprises a head (12, 52) having a head supporting surface (16, 140) for abutment against a component layer and at least one drive feature (14), via which the joining element (10, 50, 70, 100, 130) can be rotated, as well as a shaft (17) which ends via a hole-forming element (18, 54, 90, 106) in a tip (38), wherein the length of the shaft, from the head supporting surface (16) to the tip (38), is shorter than five times the maximum shaft outer diameter ($D_{Max}$), wherein the shaft (17) has a holding region (H) for connection to the component layer, and a removal region (A) having a removal profile (20, 56, 72, 102, 134) extends on the shaft (17), subsequent to the holding region (H) in the direction of the tip (38), and the removal region (A) starts spaced apart from the head supporting surface (16, 140) at a distance of at least once the maximum shaft outer diameter ($D_{Max}$), and wherein the removal region (A) lies below the lowermost component layer—base layer (34, 62, 84, 112)—and material (114) removed from the uppermost component layer—cover layer (32, 60, 82, 110)—is accommodated in recesses of the removal profile (20, 56, 74); wherein the holding region (H) has a thread-like holding structure (76, 104, 132) in a first pitch direction, with the removal profile (20, 56, 72, 102, 134) having a structure, the course of which does not correspond to the first pitch direction.

26. Composite component according to claim 25, wherein a partial welded joint is formed between at least one base layer (34, 62, 84, 112) and the joining element (10, 50, 70, 100, 130) due to the frictional energy and pressure.

27. Composite component according to claim 25, wherein the base layer (34, 62, 84, 112) comprises light metal or steel.

28. Composite component according to claim 25, wherein the cover layer (32, 60, 82, 110) is made of fiber composite plastic, or light metal, or steel.

29. Component composite according to claim 25, wherein the base layer (34, 62, 84, 112), including a rim hole in the base layer (34, 62, 84, 112) produced in the joining process, extends over the holding region (H) of the joining element (10, 50, 70, 100, 130).

30. Method for producing a component connection (30, 80, 130) from at least two component layers by means of a joining element, which joining element penetrates the component layers as it rotates and is subjected to pressure, wherein the joining element (10, 50, 70, 100, 130) removes material (114) from the at least one top component layer—the cover layer (32, 60, 82, 110)—which removed material is entrained in the removal profile (20, 56, 72, 102, 134) of the joining element (10, 50, 70, 100, 130) all the way through the bottom component layer—the base layer (34, 62, 84, 112); wherein the joining element (10, 50, 70, 100, 130), after being placed on the cover layer (32, 60, 82, 110), is rotated in a screwing-in direction at a speed of between 5,000 rpm and 10,000 rpm and is pressed against the cover layer (32, 60, 82, 110) with an axial contact pressure of between 2 kN and 5 kN.

31. Method according to claim 30, wherein a partial substance-to-substance bond is formed between the joining element (10, 50, 70, 100, 130) and the base layer (34, 62, 84, 112).

32. Method according to claim 30, wherein in a first step thereof, a first speed and a first contact pressure are used until the holding region has completely penetrated the cover layer (32, 60, 82, 110), in which case, in a second step of the method, a higher speed than the first speed and a lower contact pressure than the first contact pressure are then used.

33. Method according to claim 32, wherein in a first step thereof, a rotational speed of 3,000 rpm and 5,000 rpm is used in a screwing-in direction with a contact pressure of between 2 kN and 3 kN, and in the second step of the method, a rotational speed of between 7,000 rpm and 10,0000 rpm is used.

* * * * *